United States Patent [19]
Ohno et al.

[11] Patent Number: 5,115,776
[45] Date of Patent: May 26, 1992

[54] INTERNAL COMBUSTION ENGINE

[75] Inventors: Eishi Ohno, Mishima; Tatsuo Kobayashi, Susono, both of Japan

[73] Assignee: Toyota Jidosha Kabushiki Kaisha, Aichi, Japan

[21] Appl. No.: 736,934

[22] Filed: Jul. 29, 1991

[30] Foreign Application Priority Data

Dec. 27, 1990 [JP] Japan .................................. 2-407877

[51] Int. Cl.⁵ .......................... F02B 3/04; F02B 19/16
[52] U.S. Cl. .................... 123/299; 123/276; 123/302
[58] Field of Search ............... 123/276, 279, 299, 300, 123/302, 305

[56] References Cited

U.S. PATENT DOCUMENTS

| | | | |
|---|---|---|---|
| 4,414,940 | 11/1983 | Loyd | 123/299 |
| 4,543,930 | 10/1985 | Baker | 123/276 X |
| 4,811,708 | 3/1989 | Gruden | 123/299 |
| 4,840,147 | 6/1989 | Tanahashi et al. | 123/65 VD |
| 4,872,433 | 10/1989 | Paul et al. | 123/299 X |
| 4,924,828 | 5/1990 | Oppenheim | 123/299 |

FOREIGN PATENT DOCUMENTS

| | | |
|---|---|---|
| 61-173728 | 10/1986 | Japan . |
| 63-40527 | 3/1988 | Japan . |
| 1-124042 | 8/1989 | Japan . |
| 1-203613 | 8/1989 | Japan . |
| 2-16360 | 1/1990 | Japan . |
| 2-169834 | 6/1990 | Japan . |
| 0723972 | 2/1955 | United Kingdom . |

*Primary Examiner*—Willis R. Wolfe
*Attorney, Agent, or Firm*—Oliff & Berridge

[57] ABSTRACT

An internal combustion engine comprising a piston having a top face with a depression formed therein, and a first fuel injector and a second fuel injector arranged on the inner wall of the cylinder head. Fuel is injected from the first fuel injector when the position of the piston is high, and fuel is injected from the second fuel injector when the position of the piston is low. The axes of fuel injection of both fuel injectors are determined such that fuel injected from the fuel injectors is directed to the central portion of the depression.

12 Claims, 4 Drawing Sheets

INTERNAL COMBUSTION ENGINE

BACKGROUND OF THE INVENTION

1. Field of the Invention

The present invention relates to an internal combustion engine.

2. Description of the Related Art

In an engine in which fuel is directly injected into the combustion chamber, if fuel injected by the fuel injector directly impinges upon the inner wall of the cylinder, lubricating oil for lubricating between the inner wall of the cylinder and the outer wall of the piston is diluted by the injected fuel, and thus a problem arises in that the inner wall of the cylinder is damaged, or in some cases, a heat seizure of the piston will occur.

In a known engine, a depression is formed on the top face of the piston, and a single fuel injector is arranged on the inner wall of the cylinder head. Fuel is injected twice from the fuel injector toward the depression, i.e., at the beginning of the intake stroke and at the end of the compression stroke (Japanese Unexamined Patent Publication No. 2-169834). If fuel is injected toward the depression, the fuel does not directly impinge upon the inner wall of the cylinder, and thus it is possible to prevent damage to the inner wall of the cylinder and a heat seizure of the piston.

Where fuel is injected twice, if the fuel is injected at the beginning of the intake stroke and at the end of the compression stroke, the positions of the piston when two fuel injections are carried out are almost the same. Accordingly, in this case, by using a single fuel injector, it is possible to inject fuel toward the depression.

Nevertheless, where the positions of the piston positioned when two fuel injections are carried out are considerably different, if the direction of injection is determined so that fuel is directed toward the depression at the time one of the fuel injections carried out when the position of the piston is high, at the time of the other fuel injection, which is carried out when the position of the piston is low, fuel is not directed toward the depression but toward the inner wall of the cylinder and the fuel directly impinges upon the inner wall of the cylinder. As a result, a problem arises in that the inner wall of the cylinder is damage, and in some cases, a heat seizure of the piston will occur.

SUMMARY OF THE INVENTION

An object of the present invention is to provide an engine capable of injecting fuel toward the depression even if the positions of the piston when two fuel injections are carried out are different.

According to the present invention, there is provided an internal combustion engine comprising: a cylinder head having an inner wall; a piston having a top face having a depression formed thereon; a first fuel injector arranged on the inner wall of the cylinder head; a second fuel injector arranged on the inner wall of the cylinder head; and control means for controlling an injecting operation of the first fuel injector and the second fuel injector to inject fuel from the first fuel injector when the piston is at a first position and to inject fuel from the second fuel injector when the piston is at a second position which is lower than the first position, an axis of fuel injection of the first fuel injector being determined so that fuel injected from the first fuel injector is directed toward a central portion of the depression, and an axis of fuel injection of the second fuel injector being determined so that fuel injected from the second fuel injector is directed toward the central portion of the depression.

The present invention may be more fully understood from the description of a preferred embodiment of the invention set forth below, together with the accompanying drawings.

DESCRIPTION OF A PREFERRED EMBODIMENT

FIGS. 1 through 7 illustrate the case where the present invention is applied to a two-stroke engine.

Figure 1:
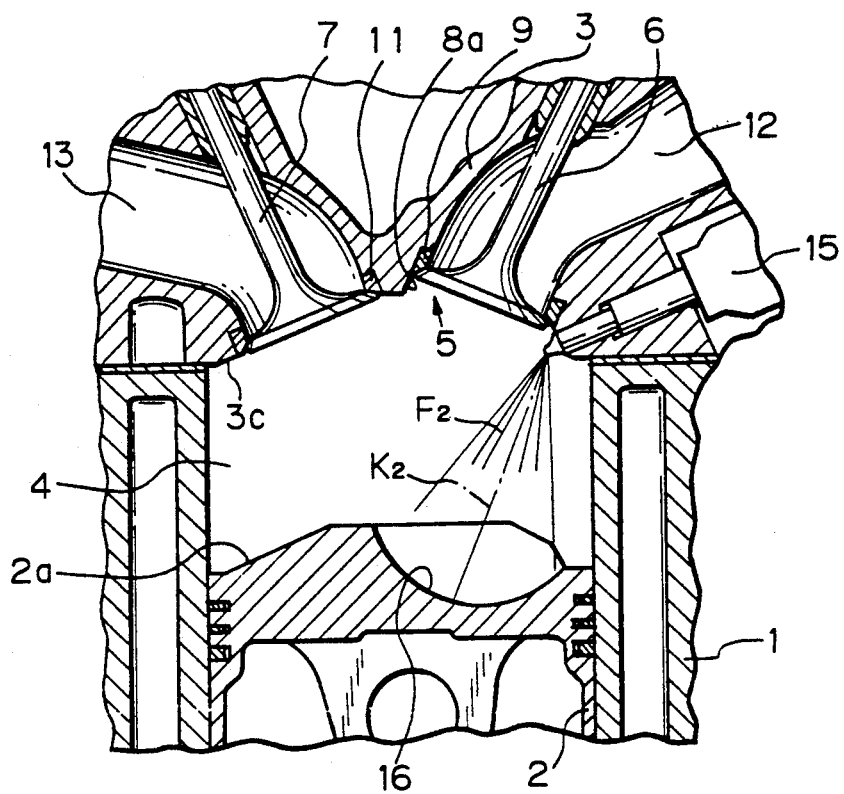
FIG. 1 is a cross-sectional side view of a two-stroke engine, taken along the line I—I in FIG. 4.
Figure 2:
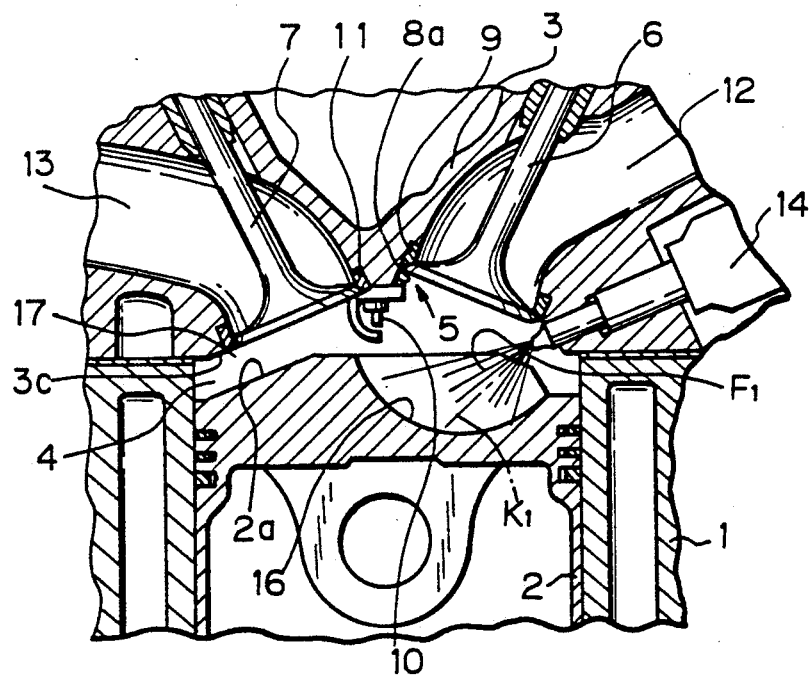
FIG. 2 is a cross-sectional side view of a two-stroke engine, taken along the line II—II in FIG. 4.
Figure 3:
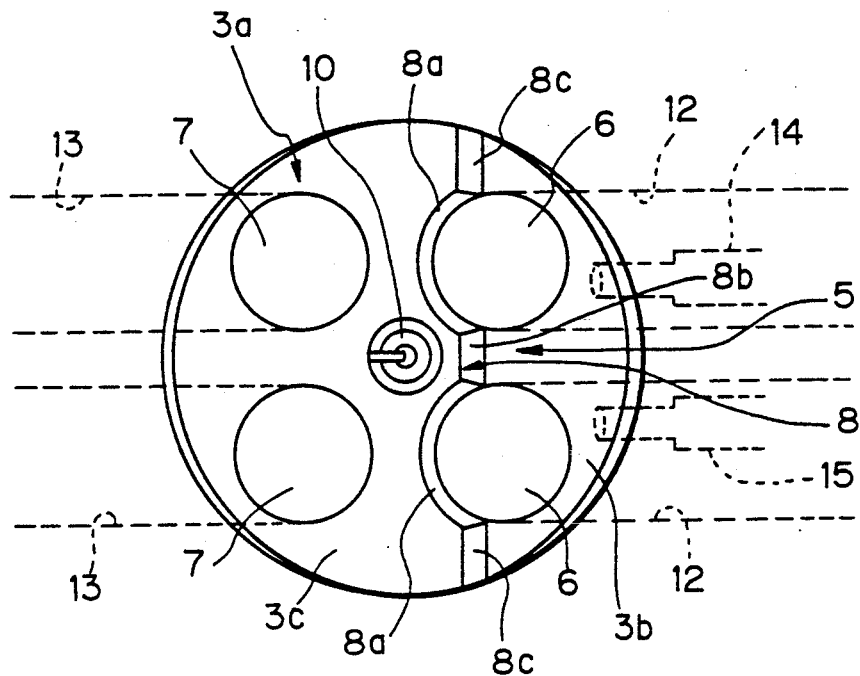
FIG. 3 is a view illustrating the inner wall of the cylinder head.

Referring to FIGS. 1 through 3, reference numeral 1 designates a cylinder block, 2 a piston reciprocally movable in the cylinder block 1, 3 a cylinder head fixed onto the cylinder block 1, and 4 a combustion chamber formed between the inner wall 3a of the cylinder head 3 and the top face of the piston 2. A depression 5 is formed on the inner wall 3a of the cylinder head 3, and a pair of intake valves 6 are arranged on the inner wall portion 3b of the cylinder head 3, which forms the bottom wall of the depression 5. The inner wall portion 3c of the cylinder head 3 other than the depression 5 is substantially flat and inclined, and a pair of exhaust valves 7 are arranged on this inner wall portion 3c of the cylinder head 3. The inner wall portions 3b and 3c of the cylinder head 3 are interconnected via the peripheral wall 8 of the depression 5. The peripheral wall 8 of the depression 5 comprises masking walls 8a arranged as close as possible to the peripheral portions of the corresponding intake valves 6 and extending archwise along the periphery of the corresponding intake valves 6, a fresh air guide wall 8b arranged between the intake valves 6, and fresh air guide walls 8c each arranged between the circumferential wall of the inner wall 3a of the cylinder head 3 and the corresponding intake valve 6. The masking walls 8a extend toward the combustion chamber 4 to a position lower than the intake valves 6 when the valves 6 are in the maximum lift position, and thus the valve opening between the valve seat 9 and the peripheral portion of the intake valve 6, which is located on the exhaust valve side, is masked by the corresponding masking wall 8a for the entire time for which the intake valve 6 is open. The fresh air guide wall 8b and the fresh air guide walls 8c are located on substantially the same plane and extend substantially in parallel to the line passing through the centers of the intake valves 6. The spark plug 10 is arranged on the inner wall portion 3c of the cylinder head 3 in such a manner that it is located at the center of the inner wall 3a of the cylinder head 3. A masking wall for masking the valve openings between the exhaust valves 7 and valve seats 11 is not provided for the exhaust valves 7, and accordingly, when the exhaust valves 7 are open, all of the valve openings formed between the exhaust valves 7 and the valve seats 11 are open to the combustion chamber 4.

Intake ports 12 are formed in the cylinder head 3 for the intake valves 6, and exhaust ports 13 are formed in the cylinder head 3 for the exhaust valves 7. A first fuel injector 14 and a second fuel injector 15 are arranged at the periphery of the inner wall 3a of the cylinder head 3 beneath the corresponding intake valves 6, and fuel is injected from these fuel injectors 14 and 15 toward the combustion chamber 4.

Figure 4:
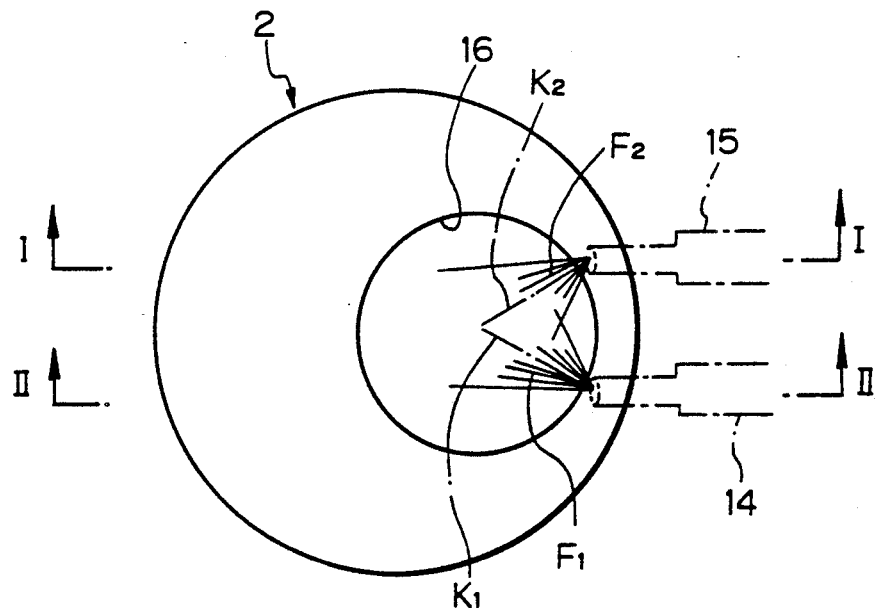
FIG. 4 is a plan view of the piston.

As illustrated in FIGS. 1, 2 and 4, a depression 16 extending from a point beneath the spark plug 10 to a point beneath the tip portions of the fuel injectors 14 and 15 is formed on the top face of the piston 2. In the embodiment illustrated in FIGS. 1, 2 and 4, the depression 16 has a substantially spherical shaped bottom wall. The top face portion 2a of the piston 2 positioned opposite to the fuel injectors 14 and 15 with respect to the depression 16 is substantially flat and inclined so that, when the piston 2 approaches TDC as illustrated in FIG. 2, a squish area 17 is formed between the inner wall portion 3c of the cylinder head 3 and the top face portion 2a of the piston 2.

Figure 5:
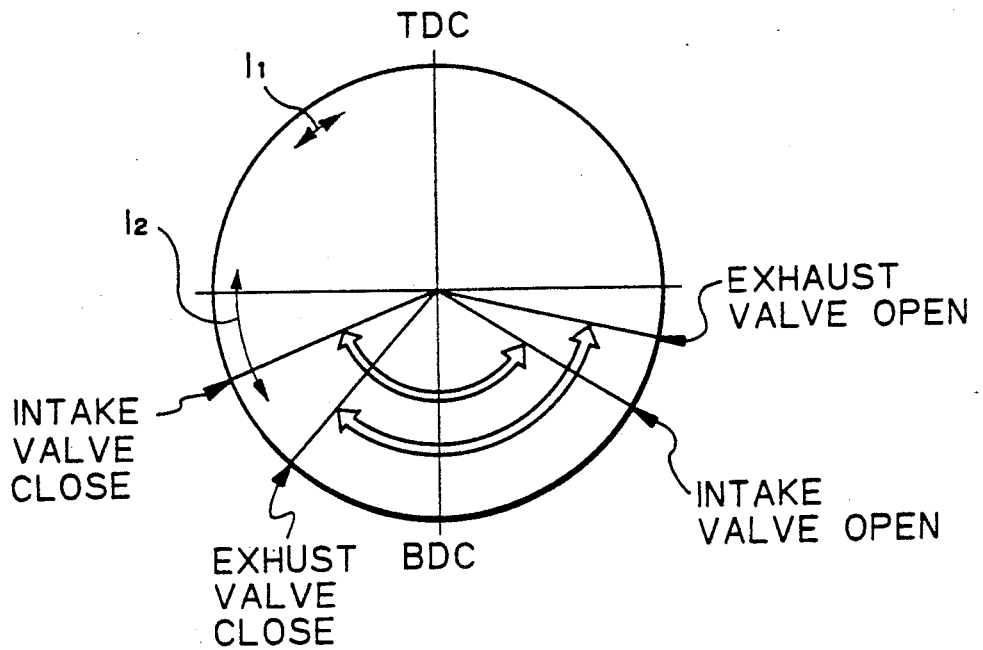
FIG. 5 is a diagram illustrating the fuel injection time and the opening time of the intake valve and the exhaust valve.
Figure 6:
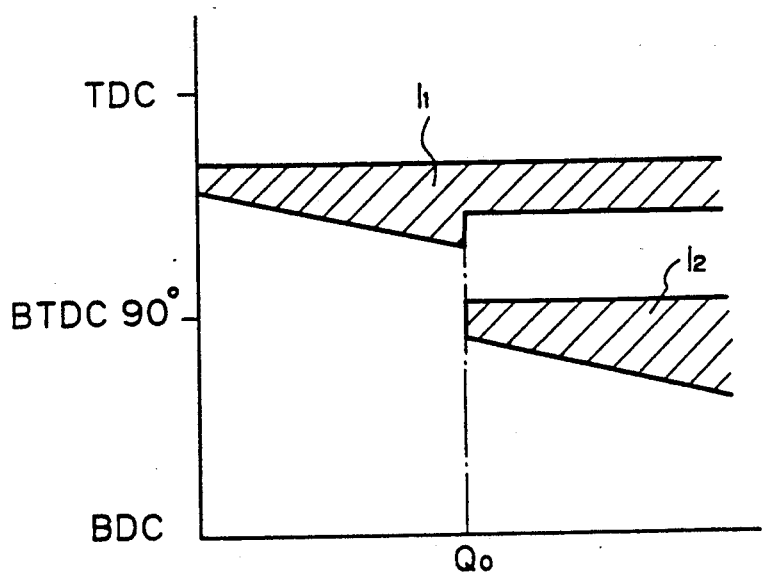
FIG. 6 is a diagram illustrating the fuel injection time.

In the embodiment illustrated in FIGS. 1 through 4, as illustrated in FIG. 5, the exhaust valves 7 open earlier than the intake valves 6, and the exhaust valves 7 close earlier than the intake valves 6. In addition, in FIGS. 5 and 6, $I_1$ indicates the fuel injection time by the first fuel injector 14, and $I_2$ indicates the fuel injection time by the second fuel injector 15. In addition, in FIG. 6, the abscissa Q indicates an engine load. As can be seen from FIGS. 5 and 6, the fuel injection time $I_1$ by the first fuel injector 14 is later than the fuel injection time $I_2$ by the second fuel injector 15, and thus the position of the piston 2 when the fuel injection by the first fuel injector 14 is carried out is higher than that of the piston 2 when the fuel injection by the second fuel injector 15 is carried out. In addition, as can be seen from FIG. 6, when the engine is operating under a light load wherein the engine load Q is lower than $Q_0$, the fuel injection is carried out by only the first fuel injector 14, and when the engine is operating under a heavy load wherein the engine load Q is higher than $Q_0$, the fuel injection is carried out by the first fuel injector 14 after the fuel injection is carried out by the second fuel injector 15. Furthermore, as can be seen from FIG. 6, the injection completion time of the injection time $I_1$ of the first fuel injector 14 and the injection completion time of the injection time $I_2$ of the second fuel injector 15 are fixed.

FIG. 1 illustrates the fuel injection by the second fuel injector 15, and FIG. 2 illustrates the fuel injection by the first fuel injector 14. Note, although FIG. 4 illustrates the fuel injections by the fuel injectors 14 and 15 at the same time, in practice the fuel injection time $I_1$ by the first fuel injector 14 is different from the fuel injection time $I_2$ by the second fuel injector 15.

When the fuel injection by the second fuel injector 15 is carried out, the position of the piston 2 is low as illustrated in FIG. 1, and at this time, fuel $F_2$ is injected from the second fuel injector 15 toward the central portion of the depression 16 so that the axis of fuel injection $K_2$ by the second fuel injector 15 extends through approximately the center of the depression 16 as illustrated in FIGS. 1 and 4. At this time, although the fuel $F_2$ injected by the second fuel injector 15 spreads in a conical shape, preferably all of the conically spreading fuel $F_2$ is directed to the depression 16.

When the fuel injection by the first fuel injector 14 is carried out, the position of the piston 2 is high as illustrated in FIG. 2, and at this time, fuel $F_1$ is injected from the first fuel injector 14 toward the central portion of the depression 16 so that the axis of fuel injection $K_1$ by the first fuel injector 14 extends through approximately the center of the depression 16 as illustrated in FIGS. 2 and 4. At this time, although the fuel $F_1$ injected by the first fuel injector 14 spreads in a conical shape, preferably all of the conically spreading fuel $F_1$ is directed to the depression 16. Accordingly, as can be seen from FIG. 4, in a plan view, the axes of fuel injections $K_1$ and $K_2$ of the fuel injectors 14 and 15 extend symmetrically with respect to the plane including both the depression 16 and the axis of the cylinder, but as can be seen from FIGS. 1 and 2, in a vertical plane, the inclined angle of the axis of fuel injection $K_1$ of the first fuel injector 14 is different from the inclined angle of the axis of fuel injection $K_2$ of the second fuel injector 15.

As mentioned above, even where two fuel injections are carried out when the piston 2 is positioned at different heights, if a pair of the fuel injectors 14 and 15 are used, it is possible to inject fuel toward the depression 16. In this case, since the injected fuels $F_1$ and $F_2$ do not directly impinge upon the inner wall of the cylinder, there is no danger that the inner wall of the cylinder will be damaged, or that a heat seizure of the piston 2 will occur.

In addition, in an engine in which fuel is directly injected into the cylinder, the fuel injection must be completed within a predetermined crankangle range, and in this case, it is usually difficult to correctly control the amount of injected fuel from the minimum amount to the maximum amount by using a single fuel injector. In this case, when using a pair of fuel injectors, and if the fuel injection is carried out by one of the fuel injectors when the engine is operating under a light load, and the fuel injection is carried out by both fuel injectors when the engine is operating under a high load, since it is possible to make the control range of the amount of injected fuel narrower for each fuel injector, it is possible to correctly control the amount of injected fuel from the minimum amount to the maximum amount for each fuel injector. Consequently, also from this point of view, the use of two fuel injectors 14 and 15 has an advantage.

Next, the operation of the two-stroke engine will be described with reference to FIGS. 1, 2 and 7.

Figure 7:
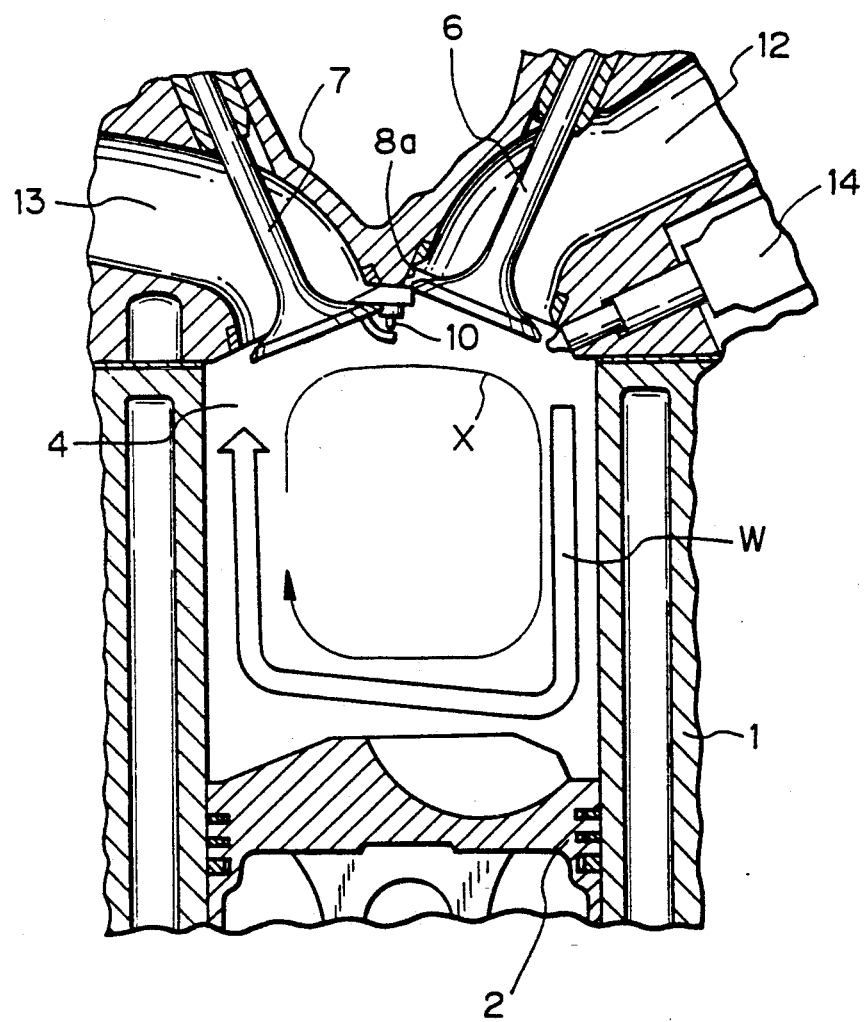
FIG. 7 is a cross-section side view of the two-stroke engine with the intake valve and the exhaust valve open.

As illustrated in FIG. 7, when the intake valves 6 and the exhaust valves 7 are open, fresh air flows into the combustion chamber 4 via the intake valves 6. At this time, since the valve openings of the intake valves 6, which openings are located on the exhaust valve side, are masked by the masking walls 8a, the fresh air flows into the combustion chamber 4 from the valve openings of the intake valves 6, which openings are located on the opposite side of the masking walls 8a. Then, as illustrated by the arrow W in FIG. 7, the fresh air flows downward along the inner wall of the cylinder, located beneath the intake valves 6 and then moves forward along the top face of the piston 2 and flows upward along the inner wall of the cylinder, located beneath the exhaust valves 7. Thus, the fresh air flows within the combustion chamber 4 in the form of a loop. The burned gas in the combustion chamber 4 is discharged via the exhaust valves 7 by the air stream W flowing in the form of a loop manner, and a swirl motion X swirling in a vertical plane is created in the combustion chamber 4 by the air stream W flowing in the form of a loop. Then, the piston 2 passes through the bottom dead center (BDC) and starts to move upward. Thereafter, the fuel injection is carried out.

When the engine is operating under a light load, the fuel $F_1$ is injected from only the first fuel injector 14 toward the depression 16 when the position of the piston 2 is high, as illustrated in FIG. 2. At the end of the compression stroke wherein the position of the piston 2 is high, since the swirl motion X (FIG. 7) created in the combustion chamber 4 is considerably attenuated, the air-fuel mixture stays within the depression 20. In addition, since the axis of fuel injection K is considerably inclined, the air-fuel mixture is collected in the depression 20 beneath the spark plug 10. That is, since the air-fuel mixture is collected in the depression 20 beneath the spark plug 10, and substantially no air-fuel mixture exists in the other region of the combustion chamber 4, the interior of the combustion chamber 4 is stratified. Then, the air-fuel mixture is ignited by the spark plug 10, and at this time, since the air-fuel mixture is collected around the spark plug 10, the air-fuel mixture is easily ignited.

When the engine is operating under a high load, the fuel $F_2$ is initially injected from the second fuel injector 15 toward the depression 16 as illustrated in FIG. 1. Approximately at the time of start of the compression stroke wherein the position of the piston 2 is low, a strong swirl motion X (FIG. 7) is created in the combustion chamber 4. Consequently, the fuel $F_2$ injected into the depression 16 is dispersed over all of the combustion chamber 4 while being vaporized by the swirl motion X, and thus a uniform air-fuel mixture is formed in the combustion chamber 4. Then, at the end of the compression stroke, the fuel $F_1$ is injected by the first fuel injector 14, and the air-fuel mixture for ignition is formed in the depression 16 beneath the spark plug 16 by the injected fuel $F_1$ Then, the air-fuel mixture for ignition is ignited by the spark plug 10 and forms an ignition source, and the uniform air-fuel mixture filling the interior of the combustion chamber 4 is ignited and burned by this ignition source.

According to the present invention, even if the positions of the piston when two fuel injections are carried out are considerably different, since the injected fuel does not directly impinge upon the inner wall of the cylinder, it is possible to prevent damage to the inner wall of the cylinder from and a heat seizure of the piston.

While the invention has been described by reference to a specific embodiment chosen for purposes of illustration, it should be apparent that numerous modifications could be made thereto by those skilled in the art without departing from the basic concept and scope of the invention.

We claim:

1. An internal combustion engine comprising:
 a cylinder head having an inner wall;
 a first fuel injector arranged on the inner wall of said cylinder head;
 a second fuel injector arranged on the inner wall of said cylinder head;
 a piston having a top face having a depression from therein, wherein said depression has a shape which is symmetrical with respect to a plane including an axis of a cylinder and said first fuel injector and said second fuel injector are arranged symmetrically with respect to said plane, the axes of fuel injection of said first fuel injector and said second fuel injector extending symmetrically with respect to said plane when viewed along the axis of the cylinder, and the inclined angle of the axis of fuel injection of said first fuel injector is smaller than the inclined angle of the axis of fuel injection of said second fuel injector when viewed along the direction perpendicular to said plane; and
 control means for controlling an injecting operation of said first fuel injector and said second fuel injector to inject fuel from said first fuel injector when said piston is at a first position and to inject fuel from said second fuel injector when said piston is at a second position which is lower than said first position, an axis of fuel injection of said first fuel injector being determined so that fuel injected from said first fuel injector is directed toward a central portion of said depression, and an axis of fuel injection of said second fuel injector being determined so that fuel injected from said second fuel injector is directed toward the central portion of said depression.

2. An internal combustion engine comprising:
 a cylinder head having an inner wall;
 a piston having a top face having a depression formed therein;
 a first fuel injector arranged on the inner wall of said cylinder head;
 a second fuel injector arranged on the inner wall of said cylinder head; and
 control means for controlling an injecting operation of said first fuel injector and said second fuel injector in response to an engine load to inject fuel from said first fuel injector when said piston is at a first position and to inject fuel from said second fuel injector when said piston is at a second position which is lower than said first position, an axis of fuel injection of said first fuel injector being determined so that fuel injected from said first fuel injector is directed toward a central portion of said depression, and an axis of fuel injection of said second fuel injector being determined so that fuel injected from said second fuel injector is directed toward a central portion of said depression, wherein when the engine load is lower than a predetermined load only said first fuel injector injects fuel and when the engine load is higher than said predetermined load, said second fuel injector initially injects fuel and then said first fuel injector injects fuel.

3. An internal combustion engine according to claim 2, wherein an injection completion time of a fuel injection of said first fuel injector and an injection completion time of a fuel injection of said second fuel injector are fixed.

4. A internal combustion engine according to claim 2, wherein said depression has a shape which is symmetrical with respect to a plane including an axis of a cylinder, and said first fuel injector and said second fuel injector are arranged symmetrically with respect to said plane.

5. An internal combustion engine according to claim 4, further comprising a spark plug arranged at a central portion of the inner wall of said cylinder head, wherein said depression extends from a point beneath said spark plug to a point beneath tip portions of said first fuel injector and said second fuel injector.

6. An internal combustion engine according to claim 5, wherein said depression has a substantially spherical shaped bottom wall.

7. An internal combustion engine according to claim 5, wherein the top face of said piston and the inner wall of said cylinder head defines a squish area therebetween on an opposite side of said depression.

8. An internal combustion engine comprising:
a cylinder head having an inner wall;
a first fuel injector arranged on the inner wall of said cylinder head;
a second fuel injector arranged on the inner wall of said cylinder heads;
a piston having a top face having depression formed therein, said depression having a shape which is symmetrical with respect to a plane including an axis of a cylinder, said first fuel injector and said second fuel injector arranged symmetrically with respect to said plane;
a pair of intake valves symmetrically arranged on the inner wall of said cylinder head with respect to said plane;
exhaust valve means arranged on the inner wall of said cylinder head;
a pair of masking walls each being formed on the inner wall of said cylinder head, each one of said pair of masking walls arranged between a corresponding intake valve and a corresponding exhaust valve means to mask a valve opening formed between a valve seat and a peripheral portion of said corresponding intake valve for the entire time for which said corresponding intake valve is open, said peripheral portion located on an exhaust valve means side of said intake valve; and
control means for controlling an injecting operation of said first fuel injector and said second fuel injector to inject fuel from said first fuel injector when said piston is at a first position and to inject fuel from said second fuel injector when said piston is at a second position which is lower than said first position, an axis of fuel injection of said first fuel injector being determined so that fuel injected from said first fuel injector is directed toward a central portion said depression, and an axis of fuel injection of said second fuel injector being determined so that fuel injected from said second fuel injector is directed toward the central portion of said depression.

9. An internal combustion engine according to claim 8, wherein said first fuel injector and said second fuel injector are arranged at a periphery of the inner wall of said cylinder head beneath said corresponding intake valves.

10. An internal combustion engine according to claim 8, wherein each of said masking walls is arranged close to peripheral portion of said corresponding intake valve, which is located on said exhaust valve means side, and extends downward, toward said piston to a position lower than said corresponding intake valve when said corresponding intake valve is in the maximum lift position thereof.

11. An internal combustion engine according to claim 10, wherein each of said masking walls extends in an arc along the peripheral portion of said corresponding intake valve.

12. An internal combustion engine according to claim 8, wherein said exhaust valve means comprises a pair of exhaust valves symmetrically arranged with respect said plane.

* * * * *